United States Patent
Cohen et al.

(10) Patent No.: US 6,571,209 B1
(45) Date of Patent: *May 27, 2003

(54) DISABLING AND ENABLING OF SUBVOCABULARIES IN SPEECH RECOGNITION SYSTEMS

(75) Inventors: Paul S. Cohen, Yorktown Heights; Srinivasa P. Rao, Jericho; Robert T. Ward, Croton-on-Hudson, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,974

(22) Filed: Nov. 12, 1998

(51) Int. Cl.⁷ .............................................. G10L 15/06
(52) U.S. Cl. ...................................... 704/251; 704/255
(58) Field of Search ................................ 704/251, 252, 704/254, 255, 270

(56) References Cited

U.S. PATENT DOCUMENTS

| | | | | | |
|---|---|---|---|---|---|
| 4,866,778 A | * | 9/1989 | Baker | .......................... | 704/251 |
| 5,027,406 A | * | 6/1991 | Roberts et al. | .............. | 704/251 |
| 5,428,707 A | * | 6/1995 | Gould et al. | ................. | 704/251 |
| 5,758,319 A | * | 5/1998 | Knittle | ......................... | 704/251 |
| 5,920,837 A | * | 7/1999 | Gould et al. | ................. | 704/251 |
| 6,073,097 A | * | 6/2000 | Gould et al. | ................. | 704/251 |
| 6,081,780 A | * | 6/2000 | Lumelsky | .................... | 704/260 |
| 6,092,043 A | * | 7/2000 | Squires et al. | .............. | 704/251 |
| 6,185,530 B1 | * | 2/2001 | Ittycheriah et al. | ......... | 704/255 |

OTHER PUBLICATIONS

Real–Time Digital Video Censoring Playback, IBM Technical Disclosure Bulletin, Sep. 1996.*

* cited by examiner

Primary Examiner—Richemond Dorvil
(74) Attorney, Agent, or Firm—F. Chau&Associates, LLP

(57) ABSTRACT

A method for designating a subvocabulary for speech recognition systems includes the steps of providing a vocabulary of words each having a flag with a first value, selecting words to be eliminated from the vocabulary, setting the flags of the selected words to a second value and processing speech based on words having the flag set to the first value. A program storage device readable by machine, tangibly embodying a program of instructions executable by the machine to perform method steps for disabling and enabling of subvocabularies in speech recognition systems, the method steps include providing a vocabulary of words each having a flag with a first value, selecting words to be eliminated from the vocabulary, setting the flags of the selected words to a second value and processing speech based on words having the flag set to the first value.

30 Claims, 2 Drawing Sheets

DISABLING AND ENABLING OF SUBVOCABULARIES IN SPEECH RECOGNITION SYSTEMS

BACKGROUND OF THE INVENTION

1. Field of the Invention

The present invention relates to speech recognition and, more particularly, to a method and system for enabling and disabling subvocabularies for recognizing speech.

2. Description of the Related Art

Conventional speech recognition systems have had difficulties related to outputting words that are deemed undesirable, such as obscenities or ethnic slurs. (It is important to note that there is no universally accepted set of undesirable words.) The conventional systems typically attack theses problems in one of two ways. In a first technique, the undesirable words are left in a vocabulary in the hope that the words would only appear if and when an end user has spoken the words. Although this technique is adequate most of the time, the results may be undesirable. For example, in a speech recognition system which has word completion capabilities such as those systems that include a keyboard-correction capability by an end user, all words to be completed that begin with a certain letter sequence are displayed thereby displaying undesirable words.

In a second technique, undesirable words are deleted from the vocabulary altogether. One problem with this technique is that every end user who wants some or all of these words to be recognized must resupply the words individually. This is typically performed by an add-word utility in a speech recognition software package. Further, the system employing the second technique needs to generate (possibly incorrect) baseforms for each of the words on-the-fly for future recognition making the second technique cumbersome, time-consuming and error-prone.

Therefore, a need exists for a system and method for enabling and disabling subvocabularies to provide a more versatile method for outputting or withholding from output words which are considered undesirable.

SUMMARY OF THE INVENTION

A method for designating a subvocabulary for speech recognition systems includes the steps of providing a vocabulary of words each having a flag with a first value, selecting words to be eliminated from the vocabulary, setting the flags of the selected words to a second value and processing speech based on words having the flag set to the first value.

A program storage device readable by machine, tangibly embodying a program of instructions executable by the machine to perform method steps for disabling and enabling of subvocabularies in speech recognition systems, the method steps include providing a vocabulary of words each having a flag with a first value, selecting words to be eliminated from the vocabulary, setting the flags of the selected words to a second value and processing speech based on words having the flag set to the first value.

In alternate methods which may be executable by the program storage device, the step of selecting words may include the step of selecting a group of words grouped together in at least one subvocabulary. The at least one subvocabulary may include a subvocabulary having words directed to a particular subject (including objectionable or undesirable subject matter such as profanity, slang, racial slurs, sexual or violent content, etc.) and/or a particular reading level. The flag is preferably a single bit and the first and second values may be zero or one or vice versa. The step of permitting access to selecting words by providing a password may be included. The step of reselecting words having the flag with the second value to return the flag to the first value thereby including the words in the vocabulary may also be included. The step of eliminating words having the flag with the second value from speech recognition processes may be included. The program storage device may further include the steps of selecting word combinations to be eliminated from the vocabulary and checking speech recognized word combinations to eliminate the selected word combinations from being processed.

Another method for removing words from speech recognition systems includes the steps of providing a vocabulary of words each having a flag value, grouping the flag values to form at least one subvocabulary of words, selecting subvocabularies to be eliminated from the vocabulary, setting the flags of the selected subvocabularies to be different from the flag value of the words in the vocabulary and processing speech based on words having the flag set to the value of the vocabulary.

In alternate methods, the step of selecting subvocabularies may include the step of selecting additional words to be eliminated from the vocabulary. At least one subvocabulary may include words directed to a particular subject and/or a particular reading level. The flag may include a binary representation of a number. The method may further include the step of permitting access to selecting subvocabularies by providing a password. The method may further include the step of reselecting subvocabularies and words to change the flag value. The method may further include the step of eliminating words having the flag with the second value from speech recognition processes. The steps of selecting word combinations to be eliminated from the vocabulary and checking speech recognized word combinations to eliminate the selected word combinations from being processed may also be included.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to speech recognition and, more particularly, to a method and system for enabling and disabling subvocabularies for recognizing speech. The present invention sets a flag, for example by using a bit string, on each word in a vocabulary of the system. Initially for objectionable or undesirable words, the flag is set to "off". The objectionable or undesirable words may be enabled (set to "on") or disabled (set to "off") by a user, thereby creating an enabled subvocabulary and a disabled subvocabulary. Further, multiple subvocabularies may be created and enabled or disabled depending on which flag or flags are used. Enabled or disabled words in the subvocabularies may be changed as needed. Access to the subvocabularies may be gained by a password or the like, for example. For the purposes of the present disclosure objectionable or undesirable words are deemed for all intents and purposes to include objectionable or undesirable phrases. Phrases of two or more words may be added or removed from a subvocabulary in the same manner as described herein for single words. The present invention described herein eliminates the difficulties described above in the related art section.

The present invention is independent of the language to be recognized, and is applicable to any subvocabularies or even individual words. For example, a user may enable/disable chemical words, geographical words, sports words and/or other words for specific topics or characteristics. By eliminating words from a vocabulary greater accuracy and speed may be achieved for recognizing words for the system. In other embodiments, age-graded speech recognition vocabularies based on standardized reading levels and word difficulty indices may be employed. This allows for the fact that many training corpora used for speech recognition systems come from business applications and are therefore unrepresentative of word usage for children and beginning readers. The invention is not limited to the above identified uses; instead the invention is broader and is applicable to any subgroup of users with specific vocabulary needs as well as to any subvocabulary as needed.

Figure 1:
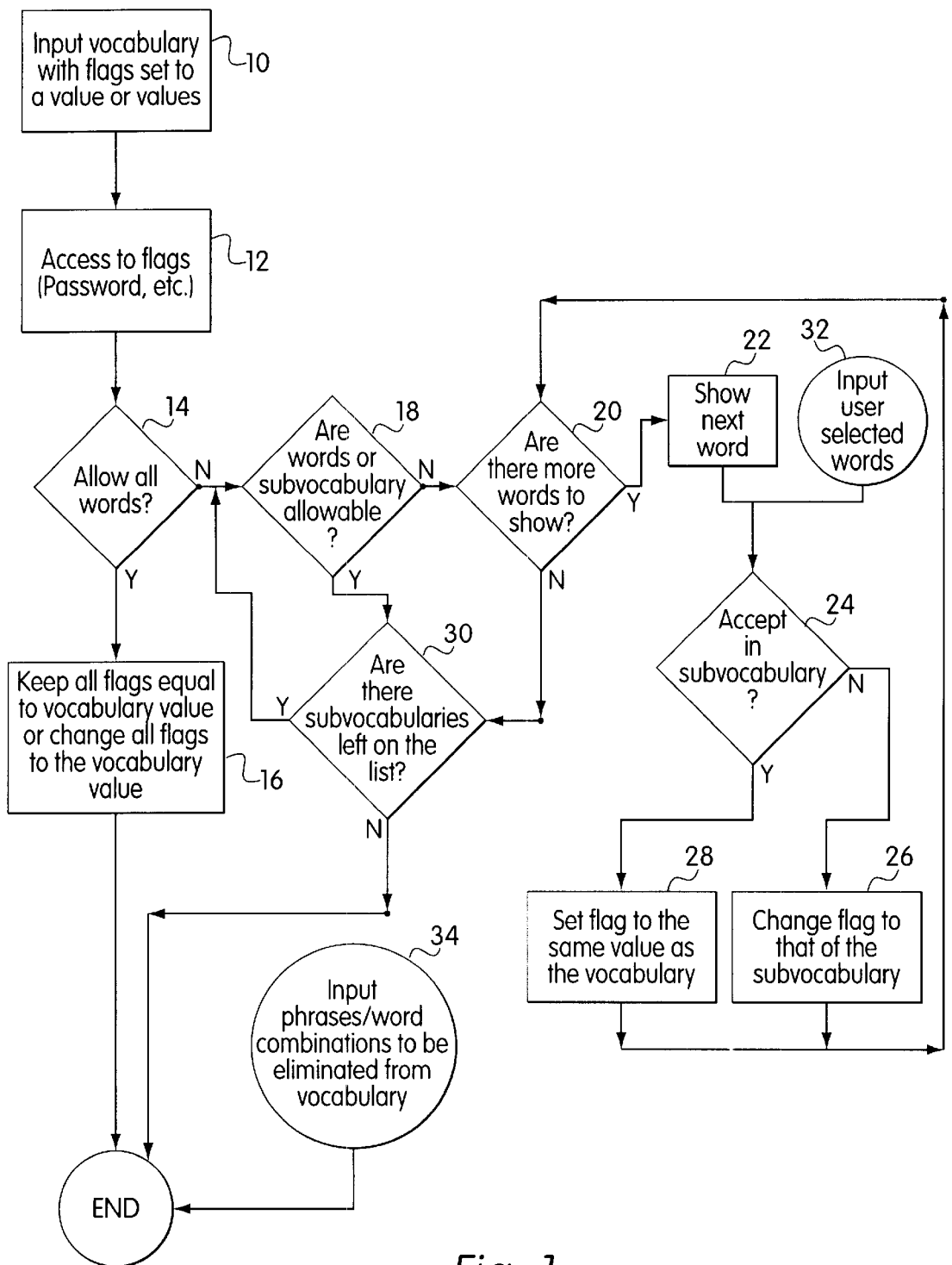
FIG. 1 is a flow/block diagram showing a system/method for enabling and disabling subvocabularies in accordance with the present invention.
Figure 2:
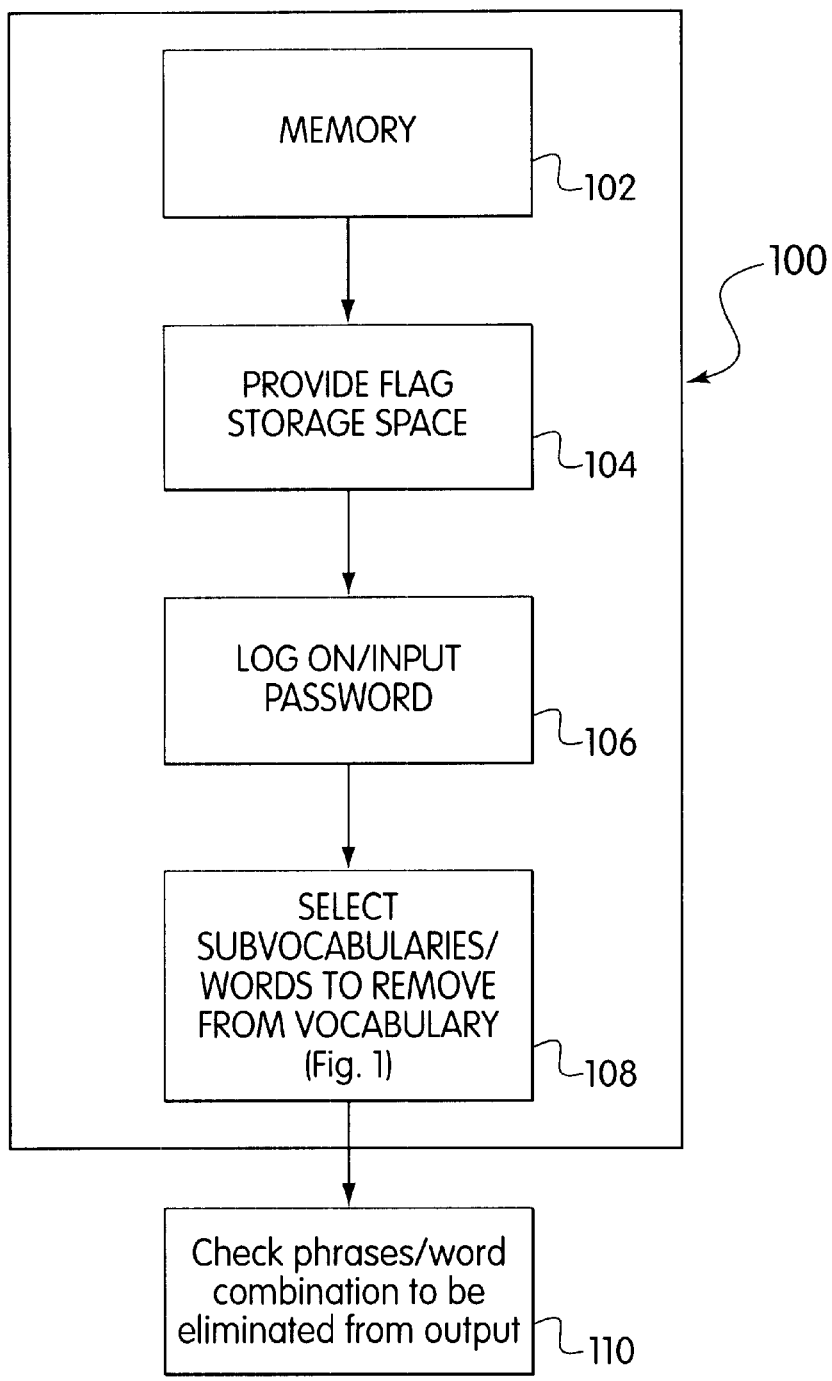
FIG. 2 is a flow/block diagram showing a system/method for accessing and enabling and disabling the subvocabularies in accordance with the present invention.

It should be understood that the elements shown in FIGS. 1–2 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a flow/block diagram is shown for a method/system, referred to generally as system 8, for building a subvocabulary, including words and phrases in accordance with the present invention. In block 10, a vocabulary includes flags set to a first value. A vocabulary and subvocabularies may also be input to reselect words or combinations of words in the subvocabulary to once again include them in the vocabulary. The words for the subvocabulary have flags set to a second value. The subvocabulary words may be preset according to a predetermined list or user defined. In one embodiment, the flags for the vocabulary include a single flag bit and the first value may be a bit set to "1" or "high" for example. The embodiment may further include a single flag bit set to indicate which words are in the subvocabulary. For example the flag bit for the subvocabulary may include a bit set to "0" or "low". In other embodiments, multiple subvocabularies may be implemented by having multiple flags. For example, the flag may include multiple bits such as "11", "00", "01" and/or "10" or include multiple states +1, −1, 0, etc. The present invention may begin in block 10 with a vocabulary having flags set or without flags. System 8 may also permit the user to build a subvocabulary or add words to existing lists as will be described herein. In block 12, if a user desires to select words for a subvocabulary or select a list or lists of words for the subvocabulary, the user may gain access by entering a password or other security code into system 8. In one example, the user may be a parent or guardian attempting to deny access to objectionable words by children.

In block 14, it is determined by the user if all words are allowable. If all words are allowable, all flags are set to "1" in block 16, permitting access to all words, If all words are not allowable, it is determined which words are not allowable as described below.

In block 18, it is determined which words are not allowable. System 8 may provide a list of categories including predetermined subvocabularies including objectionable or undesirable words, technical terms or topic-specific words, age gradation words (eliminating words based on reading level), phrases, word combinations, etc. If a subvocabulary is allowable the flag remains set to "1" and the program path is directed to block 30. In block 30, if more subvocabularies exist in system 8, the program path is returned to block 18 for the next subvocabulary. If in block 18, the subvocabulary is not allowable, the program path proceeds to block 20. In block 20, the user is prompted as to whether or not it is desirable to include additional individual words related to each subvocabulary. If the user desires to see more words, system 8 provides individual words (or phrases) to the user in block 22. The word (or phrase) may be accepted by the user in block 24. If accepted for inclusion in the subvocabulary, the flag is set accordingly, for example set to 0, in block 26. If not accepted for inclusion in the subvocabulary, the flag is set accordingly, for example set to 1, in block 28. Blocks 26 and 28 return the user to block 20 for the next word for determination. Phrases, words and word combinations may also be input directly for inclusion/exclusion to/from the vocabulary. Words may be input in block 32 and assigned a flag in blocks 26 or 28. Phrases or word combinations may be input in block 34. Phrases and word combinations are checked using speech recognition system 100 (FIG. 2).

When all the related words to the subcategory have been shown and the appropriate flag set, the program path is again directed to block 30 to test the next subvocabulary. When all subvocabularies (and words) have been exhausted the program ends. After subvocabularies are defined, subvocabularies are eliminated from consideration for system functions; for example, word completion functions would not include words in the subvocabularies. This improves accuracy and speed of processing for speech recognition.

Referring now to FIG. 2, a flow/block diagram of a system for implementing the present invention is shown. A speech recognition system 100 includes a vocabulary of words stored in a memory 102. In block 104, each word is provided with additional memory space to store a flag for identifying each word as part of the vocabulary or a subvocabulary. In block 106, a qualified user, such as a parent, may gain access to system 100 by logging on or by inputting a password or other security input. Once access is gained, in block 108, an option menu or selection form may be provided. The qualified user may then select subvocabularies, phrases and individual words using the method/system described above with reference to FIG. 1. When the subvocabularies are enabled/disabled according to the invention, the qualified user exits the option menu/selection form and returns to normal operation of system 100. A post processing module is included in block 110. Phrases or combinations of undesirable or objectionable words may be checked by, for example, post processing techniques for speech recognition systems. Post processing techniques are known to those skilled in the art for formatting, etc. of recognized speech. Phrases or word combinations are checked with the subvocabulary list to allow/disallow them from use and prevent disallowed phrases or word combinations from being output. Subvocabularies, phrases and word combinations eliminated by the qualified user are now omitted from the vocabulary and output for speech recognition functions.

Having described preferred embodiments of disabling and enabling of subvocabularies in speech recognition systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for designating a subvocabulary for speech recognition systems comprising the steps of:

providing a vocabulary of words each word having a flag with a first value;

authorizing a user to select individual words and word combinations to be eliminated from the vocabulary, the words and word combinations to be eliminated being disabled for use in the vocabulary;

setting the flags of the selected words to a second value to disable individual words and word combinations; and processing only words having the flag set to the first value.

2. The method as recited in claim 1, wherein the step of authorizing a user to select words includes the step of selecting a group of words grouped together in at least one subvocabulary.

3. The method as recited in claim 2, wherein the at least one subvocabulary includes a subvocabulary having words directed to a particular subject.

4. The method as recited in claim 2, wherein the at least one subvocabulary includes a subvocabulary having words directed to a particular reading level.

5. The method as recited in claim 1, wherein the flag is a bit and the first value is one of zero and one and the second value is the other of zero and one.

6. The method as recited in claim 1, further comprising the step of permitting access to selected words by providing a password.

7. The method as recited in claim 1, further comprising the step of reselecting words having the flag with the second value to return the flag to the first value thereby including the words in the vocabulary.

8. The method as recited in claim 1, further comprising the step of eliminating words having the flag with the second value from speech recognition processes.

9. The method as recited in claim 1, further comprising the steps of:

selecting word combinations to be eliminated from the vocabulary; and checking speech recognized word combinations to eliminate the selected word combinations from being output.

10. The method as recited in claim 1, wherein the subvocabulary includes vulgarities.

11. A method for removing words from speech recognition systems comprising the steps of:

providing a vocabulary of words each word having a flag value;

grouping words with a same flag value to form subvocabularies of words, wherein each subvocabulary includes words and word combinations having the same flag value;

authorizing a user to select subvocabularies, individual words and/or word combinations to be eliminated from the vocabulary;

setting flags of the selected subvocabularies, words and/or word combinations to be different from the flag value of the words in the vocabulary to disable subvocabularies, individual words and word combinations; and processing only words having the flag value set to the value of the vocabulary.

12. The method as recited in claim 11, wherein at least one subvocabulary includes words directed to a particular subject.

13. The method as recited in claim 11, wherein at least one subvocabulary includes words directed to a particular reading level.

14. The method as recited in claim 11, wherein the flag includes a binary representation of a number.

15. The method as recited in claim 11, further comprising the step of permitting access to selected subvocabularies by providing a password.

16. The method as recited in claim 11, further comprising the step of reselecting subvocabularies and words to change the flag value.

17. The method as recited in claim 11, further comprising the step of eliminating words having the flag with the second value speech recognition processes.

18. The method as recited in claim 11, further comprising the steps of:

selecting word combinations to be eliminated from the vocabulary; and checking speech recognized word combinations to eliminate the selected word combination from being output.

19. The method as recited in claim 17, wherein the step of authorizing a user to select subvocabularies includes the step of selecting additional words to be eliminated from the vocabulary.

20. The method as recited in claim 11, wherein the subvocabulary includes vulgarities.

21. A program storage device readable by machine, tangibly embodying a program of instructions executable by the machine to perform method steps for disabling and enabling of subvocabularies in speech recognition systems, the method steps comprising:

providing a vocabulary of words each word having a flag with a first value;

authorizing a user to select individual words and word combinations to be eliminated from the vocabulary, the words and word combinations to be eliminated being disabled for use in the vocabulary;

setting the flags of the selected words to a second value to disable individual words and word combinations; and processing only words having the flag set to the first value.

22. The program storage device as recited in claim 21, wherein the at least one subvocabulary includes a subvocabulary having words directed to a particular reading level.

23. The program storage device as recited in claim 21, wherein the flag is a bit and the first value is one of zero and one and second value is the other of zero and one.

24. The program storage device as recited in claim 21, further comprising the step of permitting access to selecting words by providing a password.

25. The program storage device as recited in claim 21, further comprising the step of reselecting words having the flag with the second value to return the flag to the first value thereby including the words in the vocabulary.

26. The program storage device as recited in claim 21, further comprising the step of eliminating words having the flag with the second value from speech recognition processes.

27. The program storage device as recited in claim 21, further comprising the steps of:
   selecting word combinations to be eliminated from the vocabulary; and
   checking speech recognized word combinations to eliminate the selected word combinations from being processed.

28. The program storage device as recited in claim 21, wherein the step of authorizing a user to select words includes the step of selecting a group of words grouped together in at least one subvocabulary.

29. The program storage device as recited in claim 21, wherein the at least one subvocabulary includes a subvocabulary having words directed to a particular subject.

30. The program storage device as recited in claim 21, wherein the subvocabulary includes vulgarities.

* * * * *